United States Patent [19]

Kawada et al.

[11] Patent Number: 5,392,275
[45] Date of Patent: Feb. 21, 1995

[54] INFORMATION RECORDING UNIT AND METHOD FOR INFORMATION RECORDING/REPRODUCTION

[75] Inventors: Haruki Kawada, Yokohama; Toshihiko Miyazaki, Hiratsuka; Hideyuki Kawagishi, Ayase; Akihiko Yamano, Yokohama, all of Japan

[73] Assignee: Canon Kabushiki Kaisha, Tokyo, Japan

[21] Appl. No.: 176,516

[22] Filed: Jan. 3, 1994

Related U.S. Application Data

[63] Continuation of Ser. No. 777,167, Oct. 16, 1991, abandoned.

[30] Foreign Application Priority Data

Oct. 19, 1990 [JP] Japan .................. 2-280696

[51] Int. Cl.$^6$ ............................................. G11B 9/00
[52] U.S. Cl. .................................... 369/126; 250/307; 250/442.11
[58] Field of Search ............... 250/442.11, 306, 307, 250/440.11; 365/151; 369/126, 276

[56] References Cited

U.S. PATENT DOCUMENTS

| | | | |
|---|---|---|---|
| 2,775,650 | 12/1956 | Mason et al. | 179/100.1 |
| 2,922,986 | 1/1960 | Chynoweth | 340/173 |
| 4,418,407 | 11/1983 | Brandinger | 369/126 |
| 4,575,834 | 3/1986 | Huck | 369/126 |
| 4,575,838 | 3/1986 | Meyer et al. | 369/276 |
| 4,785,177 | 11/1988 | Besocke | 250/442.1 |
| 4,827,466 | 5/1989 | Nishizawa | 369/126 |
| 4,837,435 | 6/1989 | Sakuhara et al. | 250/306 |
| 4,947,042 | 8/1990 | Nishioka et al. | 250/442.11 |
| 4,998,016 | 3/1991 | Nose et al. | 250/306 |
| 5,015,850 | 5/1991 | Zdeblick et al. | 369/101 |
| 5,099,117 | 3/1992 | Frohn et al. | 250/306 |
| 5,103,095 | 4/1992 | Elings et al. | 250/306 |
| 5,184,344 | 2/1993 | Takeuchi et al. | 369/126 |

FOREIGN PATENT DOCUMENTS

| | | |
|---|---|---|
| 0275881 | 7/1988 | European Pat. Off. . |
| 0368579 | 5/1990 | European Pat. Off. . |
| 3823010 | 9/1989 | Germany . |
| 137168 | 7/1985 | Japan .................. 369/126 |
| 63-161552 | 7/1988 | Japan . |
| 63-161553 | 7/1988 | Japan . |
| 63-195261 | 8/1988 | Japan . |
| 110062 | 1/1968 | United Kingdom . |
| 631089 | 12/1978 | U.S.S.R. . |
| WOA8804470 | 6/1988 | WIPO . |

OTHER PUBLICATIONS

"Scanning tunneling microscopy" by G. Binnig et al. IBM Zurich Research Lab. CH–8803 Ruschlikon, Switzerland Dec. 30, 1982 pp. 726–735.

"Silicon as a Mechanical Material" by K. E. Petersen Proceedings of the IEEE; May, 1982 pp. 419–457.

Primary Examiner—Paul M. Dzierzynski
Assistant Examiner—David V. Bruce
Attorney, Agent, or Firm—Fitzpatrick, Cella, Harper & Scinto

[57] ABSTRACT

A method and apparatus for recording information on an information recording medium and/or reproducing information from the recording medium. Probes for recording and/or reproducing information and a support for supporting the probes are arranged so that the probes are positioned to face the information recording medium. The support and the information recording medium are relatively moved by sliding on sliding surfaces thereof. The distance between the support and the recording medium is roughly set by projections formed between the support and the recording medium, and is finely adjusted during operation by a mechanism for moving the probes.

48 Claims, 6 Drawing Sheets

INFORMATION RECORDING UNIT AND METHOD FOR INFORMATION RECORDING/REPRODUCTION

This application is a continuation of application Ser. No. 07/777/167 filed Oct. 16, 1991, now abandoned.

BACKGROUND OF THE INVENTION

1. Field of the Invention

This invention relates to an information recording unit and information recording and/or reproduction apparatus. Specifically, the present invention can suitably be applied to an improvement in a recording/reproduction apparatus using a scanning tunneling microscope.

2. Related Background Art

A scanning tunneling microscope (hereinafter referred to as STM) which is capable of directly observing the electron structure at the surface of a substance or in the vicinity of the surface has been developed [G. Binnig et al., Helvetica Physica Acta, 55,726 (1982) ]. This microscope enables high-resolution measurement of a real-space image of monocrystals and amorphous materials and enables observation using a low electric power such that the medium is not damaged by current. Also, it can be used to examine various materials because it can be operated in atmospheric air or solutions as well as in ultra-high vacuum. A wide range of application of this microscope is therefore expected.

Recently, recording/reproduction apparatuses to which an STM is applied have also been developed (Japanese Patent Laid-Open Publication Nos. 63-161552 and 63-161553).

These conventional recording reproduction apparatuses have a construction such as that shown in FIG. 1.

In the apparatus, a DC voltage high enough to cause a tunnel current is applied to a recording medium 8 by using a voltage applying circuit 5 and, in this state, the distance between a probe electrode (probe) 6 and the recording medium 8 is controlled so that the tunnel current is constant. Also, a pulse voltage is applied to the recording medium 8 having a switching memory effect with respect to electrical characteristics at a recording position to locally create a portion having a different electrical resistance in the recording portion.

For reproduction, the distance between the probe 6 and the recording layer is constantly maintained by using a current amplifier 7, a servo circuit 3 and a three-dimensional (3-D) driving mechanism 2 while applying a low voltage. An XY scan driving circuit 4 and the 3-D driving mechanism 2 are used to scan over the recording medium surface to make the probe 6 follow the surface so that a detection current is constant, thereby reproducing the recorded information from the amounts of control in the direction of the Z-axis corresponding to changes in electrical resistance created by recording operation and from the position of the probe on the surface. These operations are controlled by a microcomputer 1. The tunnel current starts flowing when the distance between the probe electrode 6 and the recording medium is reduced to 1 nm. High-precision working/production techniques are therefore required for components for finely controlling the probe electrode 6 and the recording medium 8.

For this recording/reproducing process, as described above, it is necessary to control the distance between the probe electrode and the recording medium with high accuracy. At the same time, there is a need to simplify this distance control for the purpose of improving the recording/reproducing apparatus for wide use.

SUMMARY OF THE INVENTION

The present invention has been achieved generally based on the above-described prior art, and an object of the present invention is to provide an information recording medium, an information recording unit, and apparatus and method for information recording and/or reproduction, wherein even during a relative movement of the probe and the recording medium parallel to the surface of the medium, the distance therebetween can be set as desired and maintained constantly with accuracy by a simple means.

Other objects of the present invention will become apparent from the following detailed description of embodiments of the present invention.

DESCRIPTION OF THE PREFERRED EMBODIMENTS

Figure 2:
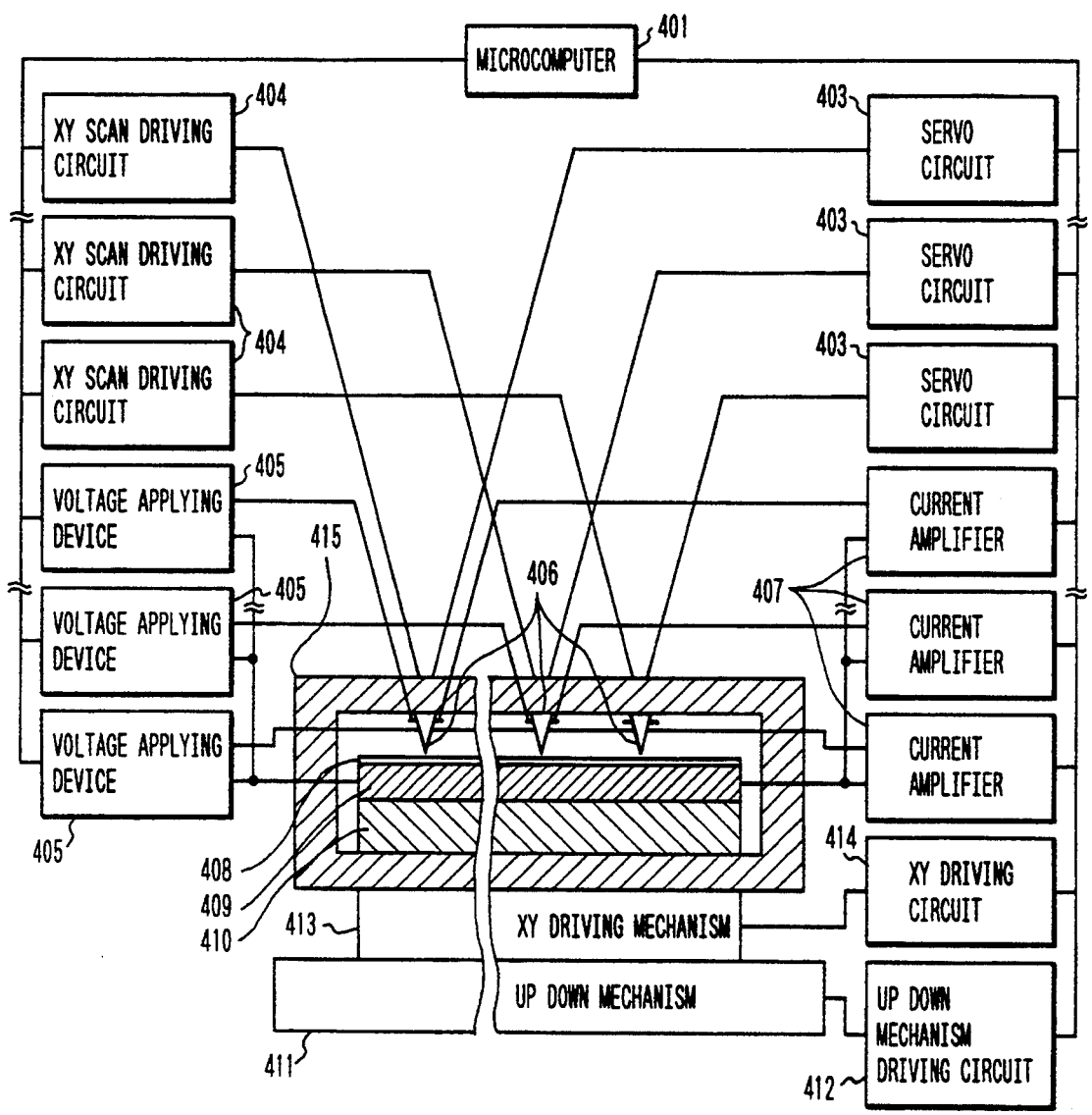
FIG. 2 is a schematic diagram of a recording/reproduction apparatus in accordance with a first embodiment of the present invention.

FIG. 2 schematically shows a recording/reproduction apparatus in accordance with the first embodiment of the present invention. The apparatus includes a microcomputer 401 for conducting overall control of the apparatus, servo circuits 403, XY scan driving circuits 404, voltage applying circuits 405 for applying voltages between probe electrodes and a recording medium, probe electrodes 406 formed of tungsten, current amplifiers 407, recording medium 408 formed by laminating four layers of SOAZ (squalirium-bis-6-octyl-azulene) by the Langmuir-Blodgett technique, a substrate electrode 409 formed by depositing Cr to 50 Å by vacuum deposition and further depositing Au to 300 Å thereon by vacuum deposition, a quartz glass substrate 410, an up-down mechanism 411 formed of laminated piezoelectric elements, an up-down mechanism driving circuit 412, an XY driving mechanism 413, an XY driving circuit 414, and a container 415 for retaining probe electrodes 406, recording medium 408, substrate electrode 409 and substrate 410. For simplification, only three probe electrodes 406 are illustrated. For each of the plurality of probe electrodes 406, the servo circuits 403, the XY scan driving circuits 404, the voltage applying circuits 405, and the current amplifiers 407 are provided, respectively, as illustrated. Later-described three-dimensional driving mechanisms (not shown in FIG. 2) are provided in the container 415 to respectively drive the probes. The container 415 is detachably attached to the body of the recording/reproduction apparatus.

To record information on recording medium 408, each probe electrode 406 is brought closer to recording medium 408, and a voltage having, for example, a rectangular pulse waveform with a peak voltage of 3.5 V and a width of 50 ns is applied by voltage applying circuit 405 to thereby change a characteristic of recording medium 408 to create a portion (corresponding to one bit) reduced in electrical resistance. The unillustrated three-dimensional driving mechanism and XY driving mechanism 413 are used to scan each recording medium 408 with each probe 406 in the X-Y directions (parallel to the surface of the recording medium), and a pulse is independently applied to a desired position from each probe electrode, thereby recording the information.

For reproduction, the recording medium surface is scanned two-dimensionally in the same manner as recording, while applying a DC voltage lower than the recording voltage, e.g., 200 mV between probe electrodes 406 and recording medium 408 and while feedback-controlling the driving of the three-dimensional driving mechanism in the z direction (the direction of the distance between probe electrodes 406 and recording medium 408) independently with respect to each probe electrode so that a current detected by using current amplifier 407 and servo circuit 403 is maintained constant at, for example, 0.1 nA. At this time, the amount of feedback (the amount of driving in the z direction) corresponds to the recorded information on the recording medium, and the information is reproduced in correspondence with the recording position. Erasing is performed by applying, for example, a triangular wave pulse voltage of 5 V having a pulse width of 1 $\mu$s as in the case of recording. These operations are controlled by the microcomputer 401.

Figure 1:
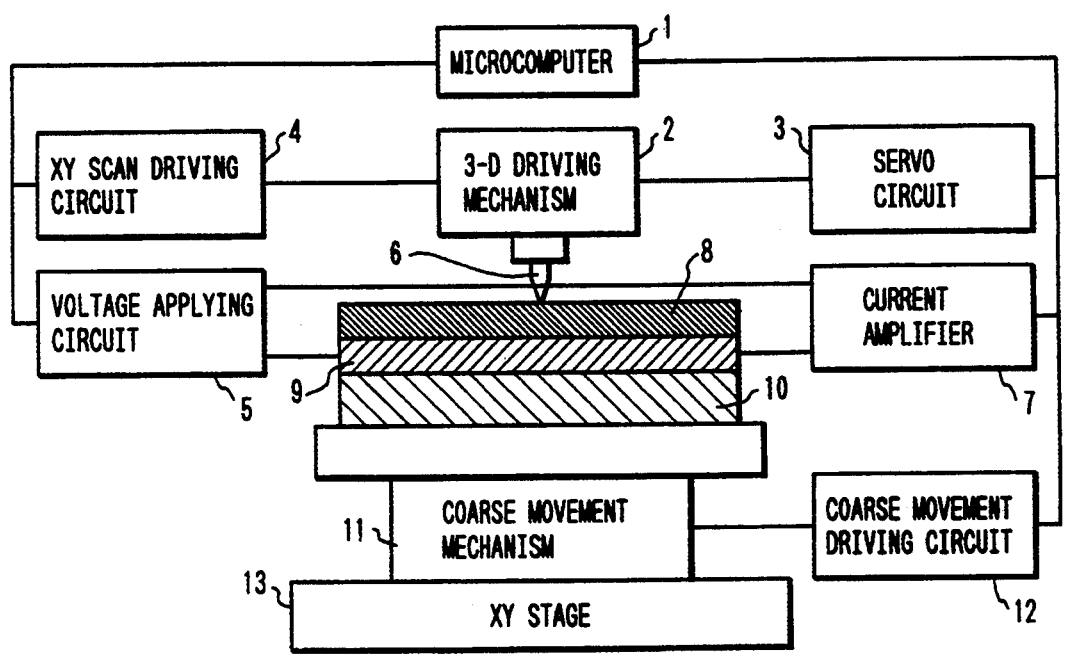
FIG. 1 is a diagram of a conventional apparatus.
Figure 3:
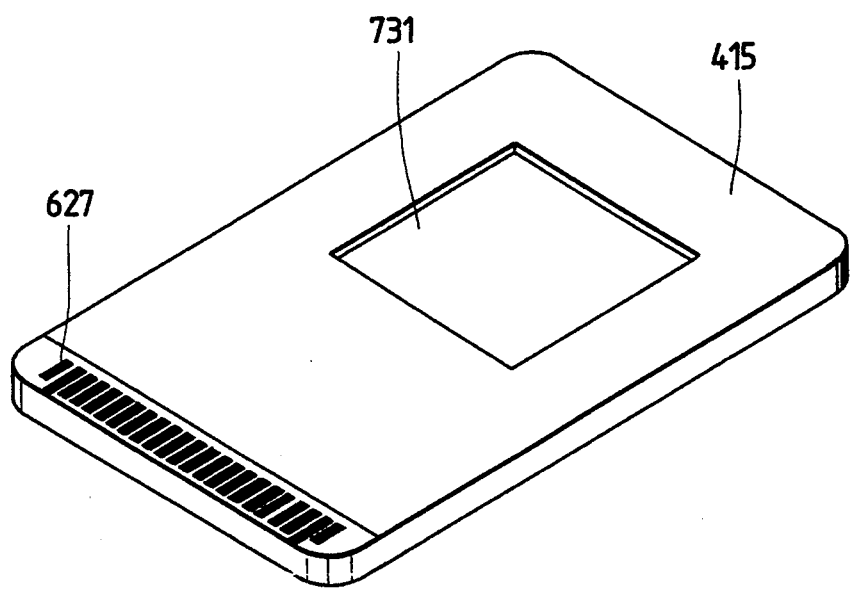
FIG. 3 is a diagram of an appearance of a container of the embodiment shown in FIG. 2.

FIG. 3 shows an appearance of the container 415 taken out of the recording/reproduction apparatus in accordance with the first embodiment. A plurality of probe electrodes and a recording medium are disposed in this container so as to face each other. The container 415 is provided with electrodes 627 for connection of signals with the main unit of the apparatus, and a window 731 through which XY driving mechanism 413 enters the container. When the container 415 is inserted into the main unit of the apparatus, electrodes 627 are brought into contact with electrodes (not shown) provided on the apparatus, thereby completing the wiring as shown in FIG. 1.

Figure 4:
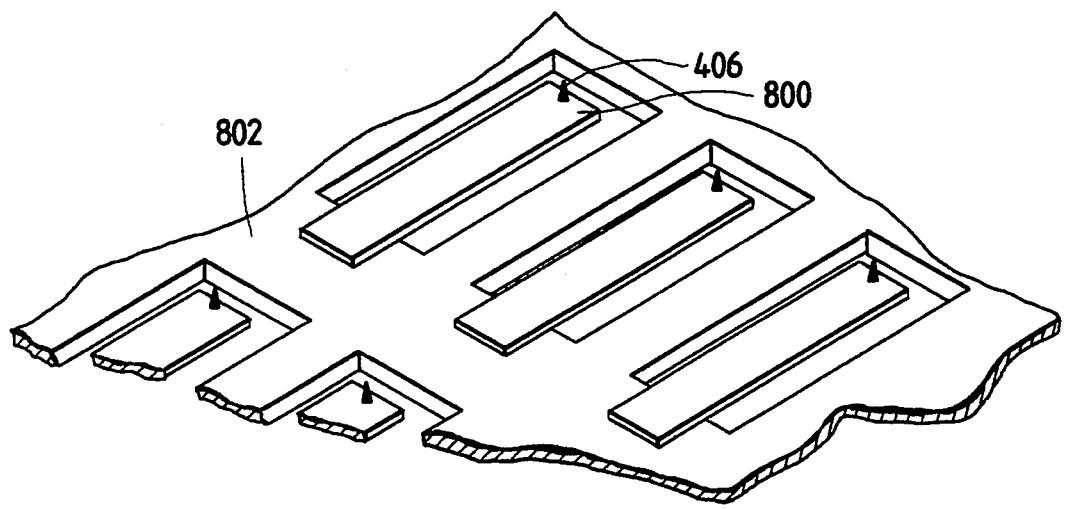
FIG. 4 is a schematic illustration of a probe electrode driving mechanism.

FIG. 4 schematically shows the three-dimensional driving mechanism for driving the probe electrodes in the direction of the Z axis (perpendicular to the surface of the recording medium) and in the X-Y directions. Bimorph beams 800 and a driving wiring region 802 are arranged. Bimorph beams 800 and probe electrodes 406 were produced by a well-known method called micromechanics or micromachining. (Reference Documents: K. E. Petersen, Proc. IEEE 70, 420 (1982) and T. R. Albrecht, et al., 4th International conference on STM/STS (STM 1989) P1-29, S10-2)

In the beam 800 are laminated two upper electrodes (Au) arranged in the widthwise direction, an insulating layer ($Si_3N_4$), a piezoelectric layer (ZnO), an insulating layer ($Si_3N_4$), an intermediate electrode (Au), an insulating layer ($Si_3N_4$), a piezoelectric layer (ZnO), an insulating layer ($Si_3N_4$), and two lower electrodes (Au) arranged in the widthwise direction. Each beam 800 has a length of 750 $\mu$m, a width of 150 $\mu$m, and a thickness of 7.5 $\mu$m. If the two piezoelectric layers are polarized in the same direction, a voltage with same polarity + (−) is applied to both the two upper electrodes and the two lower electrodes relative to the intermediate electrode to displace the end of the bimorph beam 800, i.e., the probe electrode in the direction of the Z axis. The extent of this displacement is about 5 $\mu$m when the voltage is ±15 V. It is possible to displace the probe in each of the directions of the X and Y axes by selecting the voltages to the two upper electrodes and the two lower electrodes relative to the intermediate layer. Conductors from probes 406 formed of tungsten are led over bimorph beams 800 to the circuit on the wiring region 802 and are finally connected respective electrodes 627. A circuit for supplying control signals for bimorph beams 800 from electrodes 627 is also formed on the wiring region 802.

Setting of container 415 on the apparatus will be described below with reference to the figures including cross sections of container 415.

Figure 5:
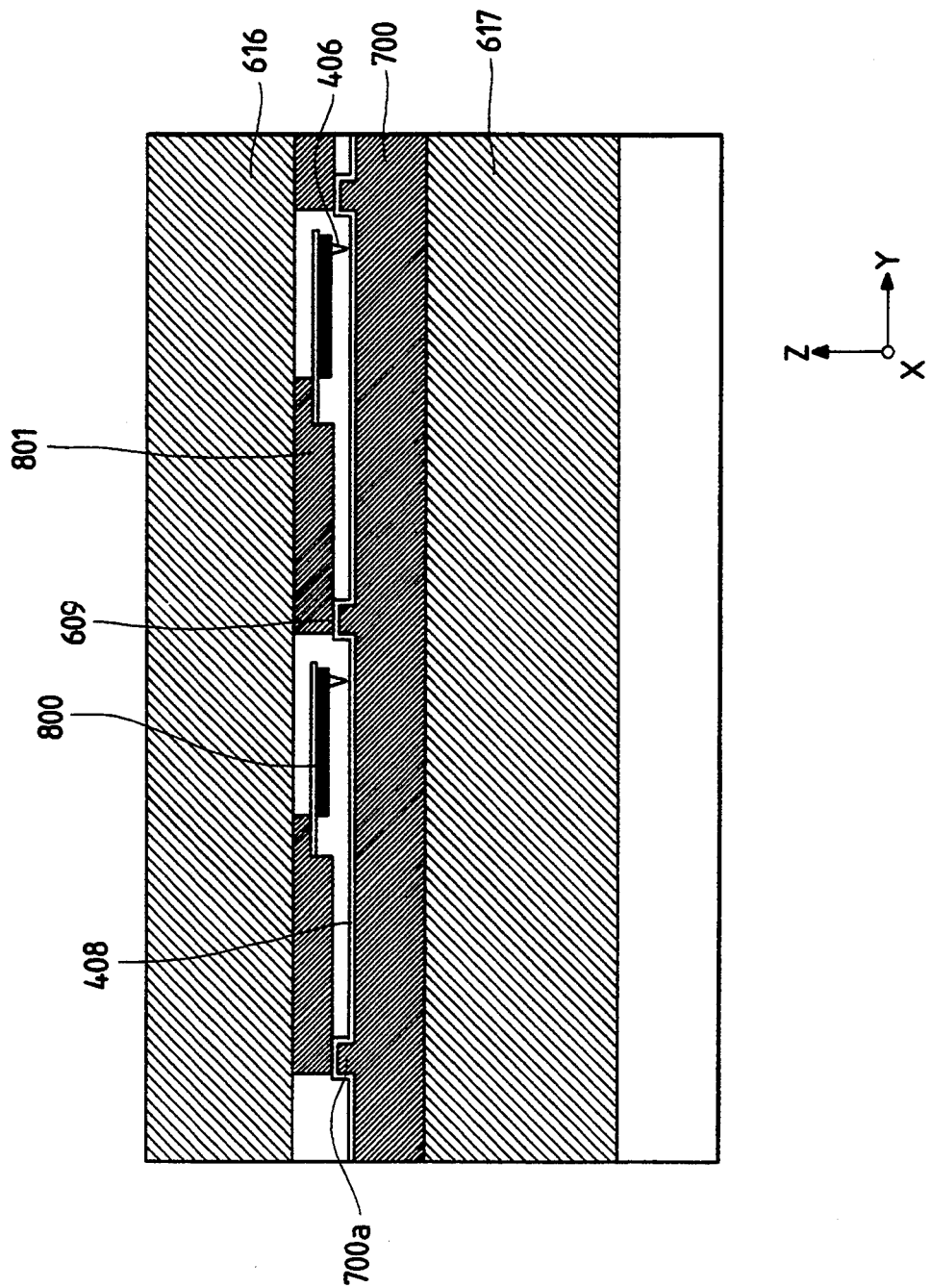
FIGS. 5 and 6 are cross-sectional views of details of the container of the embodiment.
Figure 6:
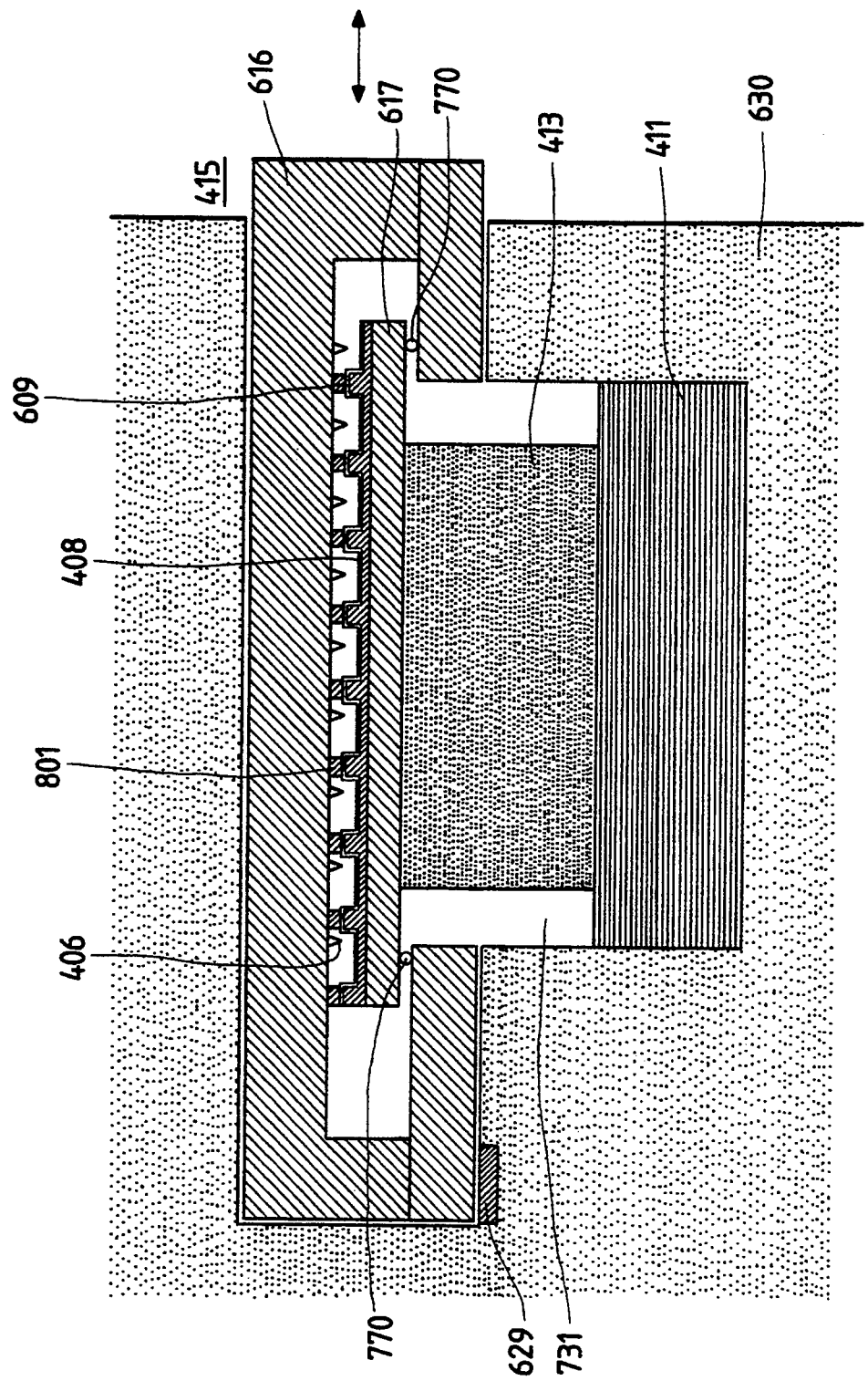

FIGS. 5 and 6 are diagrams of details of container 415 in accordance with the present embodiment.

FIG. 5 is a cross-sectional view showing the relationship between the positions of the probe electrode and the recording medium. Bimorph beams 800 are fixed on bases 801. Bases 801 are bonded and fixed to a frame 616 which is formed as a structure member for the information recording carrier. A member 700 is a recording substrate formed of the above-mentioned substrate electrode 409 for recording medium 408 and substrate 410. Projections 700a are formed on the recording substrate 700. The recording substrate 700 is fixed on a frame 617 which is connected to XY driving mechanism 413. The lower surfaces of bases 801 and the upper surfaces of projections 700a are finished as flat planes with high accuracy. The upper surfaces or projections 700a are also covered by the recording medium 408. The height of projections 700a is determined by high-accuracy working so that the distance between bases 801 supporting bimorph beams 800 and surface portions of recording medium 408 other than the projections (i.e., surfaces used for recording/reproduction) is set to a predetermined value. The recording medium on projections 700a and bases 801 slide on slides surfaces 609. This close contact between the recording medium on projections 700a and bases 801 ensures that the distance between probe electrodes 406 and the portions of recording medium 408 at which recording or reproduction is actually effected is adjusted to some degree, that is, this state is that rough adjustment of the distance has been completed. When the plurality of probe electrodes 406 are displaced relative to recording medium 408 in the X-Y directions to a large extent at a time, XY driving mechanism 413 drives recording medium 408 in X-Y directions through frame 617 while maintaining recording medium 408 on projections 700a and bases 801 in close contact. Recording medium 408 on projections 700a and bases 801 thereby slide on slide surfaces 609. Thus, the probe electrodes 406 and the surfaces of recording medium 408 actually used for recording or reproduction continue to maintain said state of the rough adjustment of the distance during the driving of XY driving mechanism and after the driving. There is, therefore, no need for a time-consuming operation for adjusting the distance between probe electrodes 406 and recording medium 408 each time they are moved to a large extent in X-Y directions for recording or reproduction.

FIG. 6 shows a state in which an information recording cartridge is set in an apparatus body 630 and XY driving mechanism 413 formed of an inchworm arrangement of piezoelectric elements is inserted through window 731 by up-down mechanism 411. Frame 617 on which the recording substrate is fixed has a surface for connection to XY driving mechanism 413 on the opposite side from the recording medium 408. An electrode connector 629 is provided to supply signals and power from the control system in the main body of the apparatus to the internal circuit of the container, i.e., the information recording cartridge. The container is sealed by a mechanical-seal packing 770 to form a closed internal space. This closed space is defined by bases 801, frames 616 and 617, packing 770, recording substrate 700 and recording medium 408.

Container 415 can be attached to or detached from the apparatus body 630 as indicated by the arrows. At the time of attachment or detachment, up-down mechanism 411 moves XY driving mechanism 413 downward to a position to avoid interference of XY driving mechanism 413 with attachment or detachment of container 415.

When container 415 is inserted into the apparatus body 630, electrode connector 629 and electrodes 627 are brought into contact and electrically connected to each other to complete the circuit shown in FIG. 2. At the time of recording or reproduction, the voltage applied to each bimorph beam 800 is controlled to control the distance between each probe electrode 406 and recording medium 408 and a x-y direction fine scanning condition. Scanning of a large distance within the recording medium 408 surface is effected at a time by xy driving mechanism 413.

Since the slide portion with projection is formed on the recording medium surface side, it is possible to prevent the damage caused by contact of portions of the probe electrodes, the bimorph beams and the bases with the recording/reproduction regions of the medium.

As described above, this embodiment is directed to a unit carrying an information recording medium on which information is recorded and/or from which information is reproduced by an information recording-/reproduction apparatus. The unit includes probes for recording information on the information recording medium and/or reproducing information from the information recording medium, a support for supporting the probes so that the probes are positioned to face the information recording medium, and slide surfaces formed on the support to enable a relative movement between the support and the information recording medium while the distance between the support and the information recording medium is maintained constant. Also, this embodiment is directed to an apparatus for recording information on an information recording medium and/or reproducing information from the information recording medium. The apparatus includes probes for recording information on the information recording medium and/or reproducing information from the information recording medium, a support for supporting the probes so that the probes are positioned to face the information recording medium, and slide surfaces formed on the support to enable a relative movement between the support and the information recording medium while the distance between the support and the information recording medium is maintained constant. Also, the embodiment is directed to a method for recording information on an information recording medium and/or reproducing information from the information recording medium. The method includes the step of relatively moving the information recording medium and a support for supporting probes for information recording and/or information reproduction so that the probes are positioned to face the information recording medium, with sliding on sliding surfaces thereof while the distance between the support and the information recording medium is maintained constant, and the step of recording information on the information recording medium with the probes and/or reproducing information from the recording medium. Further, the embodiment is directed to an information recording medium for information recording and/or information reproduction using probes provided in an information recording/reproduction apparatus to record information and/or reproduce information. The information recording medium includes recording regions in which information recording and/or information reproduction is effected with the probes, and slide surfaces which enable relative movement between the recording regions and a support for supporting the probe while the distance between the recording regions and the support is maintained constant.

By these means, the desired distance between the medium and the probes relatively moved parallel to the surface of the medium can easily be maintained constant with high accuracy.

A second embodiment of the present invention will now be described below. In this embodiment, a high polymer containing fluorine atoms, i.e., polyimide formed by polyaddition-polymerizing pyromellitic anhydride, 2,2-bis-(4-aminophenoxyphenyl)-1,3-hexafluoropropane is used as a recording medium material instead of SOAZ used in the first embodiment. The apparatus of this embodiment is not illustrated because it is the same as that of the first embodiment. Recording, reproduction and erasing can be performed in the same manner as the first embodiment. By the use of polyimide containing fluorine atoms for the recording layer, the surface energy of the slide portions is reduced so that the recording substrate can be moved smoothly.

Thus, polyimide, in particular, a polyimide containing fluorine atoms is used for the recording medium and this material is also applied to the slide surface to form a slide layer for sliding on the support in accordance with this embodiment, whereby it is possible to form a suitable lubrication layer on the sliding surface simultaneously with the formation of the recording medium.

Figure 7:
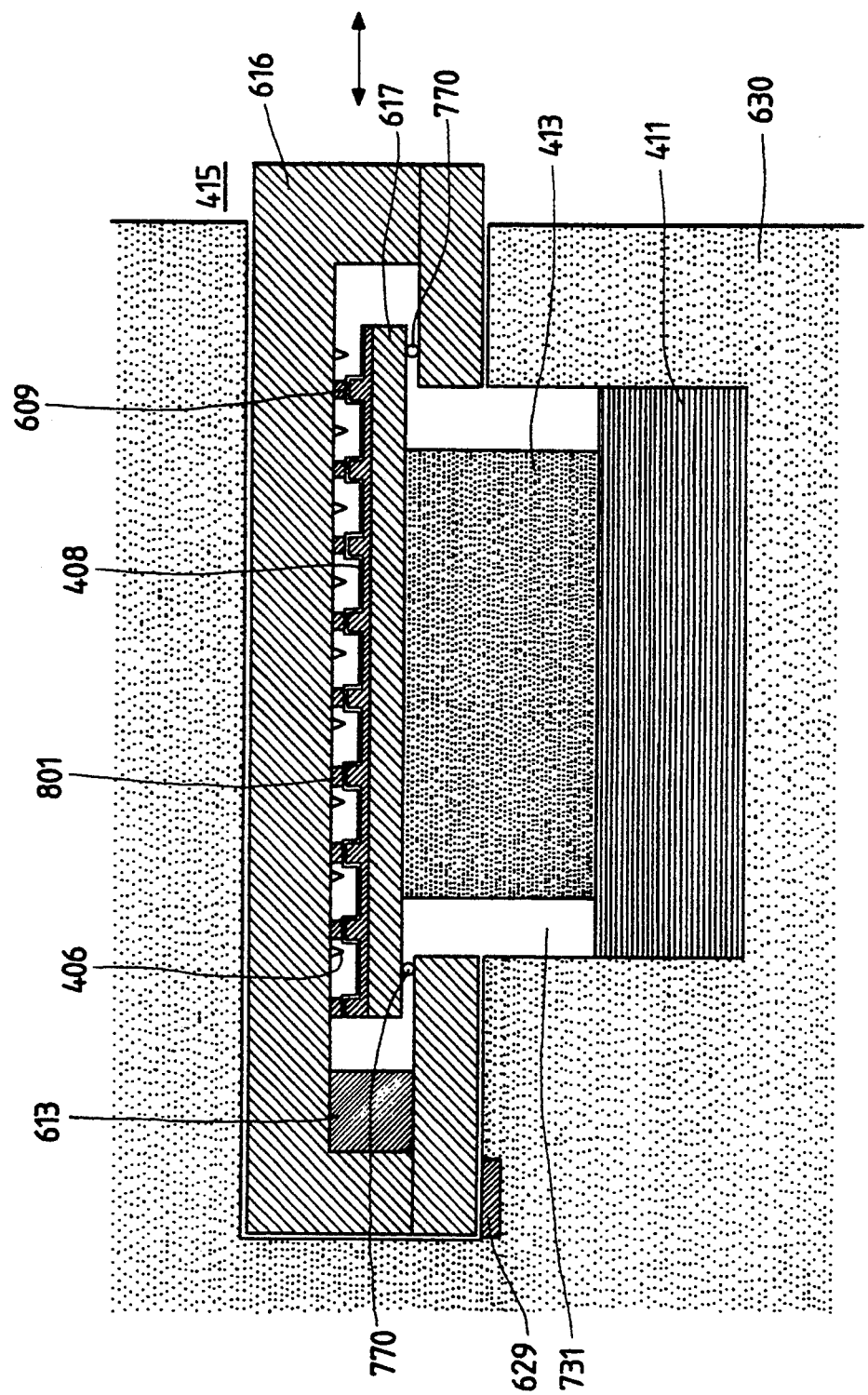
FIG. 7 is a cross-sectional view of a recording/reproduction apparatus in accordance with a third embodiment of the present invention.

A third embodiment of the present invention will be described below with reference to FIG. 7. Components corresponding to those of the first embodiment are indicated by the same reference numerals. In this embodiment, all XY scan driving circuits 404 and all servo circuits 403 shown in FIG. 1 are incorporated in container 415 as a drive circuit 613. Except for this, the construction is the same as that of the first and second embodiments, so this embodiment is illustrated in the figure corresponding to FIG. 6. A selector for selection of driving of probe electrodes 406 may be included in drive circuit 613. Command signals and the like from microcomputer 401 are supplied to the drive circuit in container 415 through electrode connector 629 and electrodes 627.

In the above-described embodiments, only probe electrodes 406 and the recording medium (and the drive circuit) are accommodated in the container and the container is detachably attached to the apparatus body. The recording medium can, therefore, be interchanged together with the container and there is no need to change the closed state of the interior of the container for interchange of the recording medium. Also, the unit can be interchanged while maintaining probes 408 and recording medium 408 in a certain closed state. At the time of X-Y direction position control as well, this state can be maintained constant by virtue of the above-described slide portions. Therefore, probe electrodes 406 and recording medium 408 can be positioned speedily after frame insertion.

In accordance with the structure of the present embodiments, since components to be worked with accuracy, including probe electrodes and recording medium 408, can be assembled in one unit, they can be manufactured in a process separate from the process for manufacturing rough-movement components, circuits and interface units which do not require high-precision working. As a result, the assembly of the apparatus is facilitated, resulting in improvement in productivity. Since the high-precision components can be interchanged by detaching the container, the apparatus can easily be maintained with respect to the damage caused by an accident.

In the above-described embodiments, the probe electrodes, bimorph beams and parts are produced by micromechanics techniques and can therefore be improved in accuracy, and the drive circuit and other components can be assembled together with the bimorph beams on the same substrate.

The recording/reproduction apparatus in accordance with the above-described embodiments may be an apparatus having the function for recording, reproduction, or 0 information recording, i.e., erasing alone, and may be an apparatus having a combination of these functions.

It is within the scope of the invention that the projections are formed on bases or frame 616. Also, the projections can be formed separately of the recording substrate and the bases.

Thus, according to the above-described embodiments, an information recording medium, an information recording unit, and apparatus and method for information recording and/or reproduction can be provided, wherein even during a relative movement of the probe and the recording medium parallel to the surface of the medium, the distance therebetween can be set as desired and maintained constant with high accuracy in a simple manner.

What is claimed is:

1. A unit for carrying an information recording medium on which at least one of information recording and information reproduction is performed, said unit comprising:
   a probe for at least one of recording the information on the information recording medium and reproducing the information from the information recording medium;
   a support for supporting said probe so that said probe is positioned to face the information recording medium; and
   a slide surface formed on said support and projections formed on said information recording medium in sliding contact with the slide surface to enable a relative movement between said support and the information recording medium while a distance between said support and the information recording medium is maintained constant.

2. A unit according to claim 1, comprising a plurality of such probes and said support supports the plurality of probes so that all the probes are positioned to face the information recording medium.

3. A unit according to claim 1, wherein said unit can be wholly detachably attached to an information recording/reproduction apparatus for recording information on the information recording medium and/or reproducing information from the same through said probe.

4. A unit according to claim 1, further comprising a container for enclosing said probe, said support and said slide surface.

5. A unit according to claim 1, further comprising a mechanism for driving said probe and a drive circuit for controlling said mechanism.

6. A method for at least one of recording information on an information recording medium and reproducing information from the information recording medium through a probe, said method comprising the steps of:
   at least one of recording the information on the information recording medium and reproducing the information from the information recording medium through the probe; and
   relatively moving the information recording medium and a support for supporting the probe so that the probe is positioned to face the information recording medium with sliding between a slide surface of the support and projections formed on the information recording medium in sliding contact with the slide surface.

7. A method according to claim 6, wherein a polyimide film containing fluorine atoms is used as the information recording medium.

8. A method according to claim 7, wherein the polyimide film containing fluorine atoms and the support are made to slide on each other in said relative movement step.

9. A method according to claim 6, wherein a plurality of probes for information recording and/or information reproduction provided on the support and the information recording medium are relatively moved in said relative movement step.

10. An apparatus for at least one of recording information on an information recording medium and reproducing information from the information recording medium, said apparatus comprising:
    a probe;
    an information processing section for at least one of recording the information on the information recording medium and reproducing the information from the information recording medium through said probe;
    a support for supporting said probe so that said probe is positioned to face the information recording medium; and
    a slide surface formed on said support to enable a relative movement between said support and projections formed on the information recording medium in sliding contact with the slide surface while a distance between said support and the information recording medium is maintained constant.

11. An apparatus according to claim 10, comprising a plurality of such probes and said support supports the plurality of probes so that all the probes are positioned to face the information recording medium.

12. An apparatus according to claim 10, further comprising a container for enclosing said probe, said support and said slide surface.

13. An apparatus according to claim 10, further comprising a mechanism for driving said probe.

14. An apparatus according to claim 13, wherein said mechanism moves said probe relative to the information recording medium parallel to a surface of the information recording medium.

15. An apparatus according to claim 13, wherein said mechanism moves said probe to finely adjust a distance between said probe and the information recording medium.

16. An information recording medium used for at least one of recording and reproducing information through a probe supported on a support, said information recording medium comprising:
   an information recording region in which at least one of information recording and information reproduction is effected with the probe; and
   a slide surface on the support and projections formed on the information recording medium in sliding contact with the slide surface such that the support and said information recording region are relatively movable while a distance between the support and the information recording region is maintained constant.

17. An information recording medium according to claim 16, wherein said slide surface is provided on an upper surface of a projection which is formed so as to set a distance between the support and the information recording region on a substrate on which the information recording medium is provided.

18. An information recording medium according to claim 16, wherein said information recording medium is constituted of a polyimide film containing fluorine atoms.

19. A unit for carrying an information recording medium on which at least one of information recording and information reproduction is performed, said unit comprising:
   a probe for at least one of recording the information on the information recording medium and reproducing the information from the information recording medium;
   a support for supporting said probe so that said probe is positioned to face the information recording medium; and
   a slide surface formed on said support and projections formed on the information recording medium in sliding contact with the slide surface to enable a relative movement between said support and the information recording medium while a distance between said support and the information recording medium is maintained constant,
   wherein said probe has a sharp edge.

20. A unit according to claim 19, comprising a plurality of such probes and said support supports the plurality of probes so that all the probes are positioned to face the information recording medium.

21. A unit according to claim 19, wherein said unit can be wholly detachably attached to an information recording/reproduction apparatus for recording information on the information from the same through said probe.

22. A unit according to claim 19, further comprising a container for enclosing said probe, said support and said slide surface.

23. A unit according to claim 19, further comprising a mechanism for driving said probe and a drive circuit for controlling said mechanism.

24. A method for at least one of recording information on an information recording medium and reproducing information from the information recording medium through a probe having a sharp edge, said method comprising the steps of:
   at least one of recording the information on the information recording medium and reproducing the information from the information recording medium through the probe and;
   relatively moving the information recording medium and a support for supporting the probe so that the probe is positioned to face the information recording medium with sliding between a slide surface on the support and projections formed on the information recording medium in sliding contact with the slide surface.

25. A method according to claim 24, wherein a polyimide film containing fluorine atoms is used as the information recording medium.

26. A method according to claim 25, wherein the polyimide film containing fluroine atoms and the support are made to slide on each other in said relative movement step.

27. A method according to claim 24, wherein a plurality of probes for at least one of information recording and information reproduction provided on the support and the information recording medium are relatively moved in said relative movement step.

28. An apparatus for at least one of recording information on an information recording medium and reproducing information from the information recording medium, said apparatus comprising:
   a probe having a sharp edge;
   an information processing section for at least one of recording the information on the information recording medium and reproducing the information from the information recording medium through said probe;
   a support for supporting said probe so that said probe is positioned to face the information recording medium; and
   a slide surface formed on said support and projections formed on the information recording medium in sliding contact with the slide surface to enable a relative movement between said support and the information recording medium while a distance between said support and the information recording medium is maintained constant.

29. An apparatus according to claim 28, comprising a plurality of such probes and said support supports the plurality of probes so that all the probes are positioned to face the information recording medium.

30. An apparatus according to claim 28, further comprising a container for enclosing said probe, said support and said slide surface.

31. An apparatus according to claim 28, further comprising a mechanism for driving said probe.

32. An apparatus according to claim 31, wherein said mechanism moves said probe relative to the information recording medium parallel to a surface of the information.

33. An apparatus according to claim 31, wherein said mechanism moves said probe to finely adjust a distance between said probe and the information recording medium.

34. An information recording medium used for at least one of recording and reproducing information through a probe supported on a support, the probe having a sharp edge, said information recording medium comprising:

an information recording region in which at least one of information recording and information reproduction is effected with the probe; and a slide surface on the support and projections formed on the information recording medium in sliding contact with the slide surface such that the support and said information recording region are relatively movable while a distance between the support and the information recording region is maintained.

35. An information recording medium according to claim 34, wherein said information recording medium is constituted of a polyimide film containing fluorine atoms.

36. A unit according to claim 4, comprising a plurality of such probes and said support supports the plurality of probes so that all the probes are positioned to face the information recording medium.

37. A unit according to claim 4, wherein said unit can be wholly detachably attached to an information recording/reproduction apparatus for recording information on the information from the same through said probe.

38. A unit according to claim 4, further comprising a mechanism for driving said probe and a drive circuit for controlling said mechanism.

39. A method for at least one of recording information on an information recording medium and reproducing information from the information recording medium through a probe, said method comprising the steps of:

providing the probe and a support for the probe, the support having a slide surface, and sealing the probe and the support into a container;

at least one of recording the information on the information recording medium and reproducing the information from the information recording medium through the probe; and relatively moving the information recording medium and the support so that the probe is positioned to face the information recording medium while sliding the slide surface on projections formed on the information recording medium in sliding contact with the slide surface.

40. A method according to claim 39, wherein a polyimide film containing fluorine atoms is used as the information recording medium.

41. A method according to claim 40, wherein the polyimide film containing fluroine atoms and the support are made to slide on each other in said relative movement step.

42. A method according to claim 39, wherein a plurality of probes for at least one of information recording and information reproduction are provided on the support and the information recording medium and are relatively moved in said relative movement step.

43. An apparatus according to claim 12, comprising a plurality of such probes and wherein said support supports the plurality of probes so that all the probes are positioned to face the information recording medium.

44. An apparatus according to claim 12, further comprising a mechanism for driving said probe.

45. An apparatus according to claim 44, wherein said mechanism moves said probe relative to the information recording medium parallel to a surface of the information recording medium.

46. An apparatus according to claim 44, wherein said mechanism moves said probe to finely adjust a distance between said probe and the information recording medium.

47. An information recording medium used for at least one of recording and reproducing information through a probe, comprising:

an information recording region provided on a substrate, in which at least one of information recording and information reproducing is to be effected with the probe; and a projection region provided outside of said information recording region provided on said substrate and projecting from a surface of said information recording medium.

48. An information recording medium according to claim 47, wherein said projection region has a slide surface.

* * * * *

UNITED STATES PATENT AND TRADEMARK OFFICE
CERTIFICATE OF CORRECTION

PATENT NO. : 5,392,275

DATED : February 21, 1995

INVENTOR : HARUKI KAWADA, ET AL.

It is certified that errors appear in the above-identified patent and that said Letters Patent is hereby corrected as shown below:

Title Page:

[56] References Cited

Foreign Patent Documents, "Germany" should read --Fed. Rep. of Germany--; and "110062  1/1968 United Kingdom." should read --110622  1/1968 United Kingdom.--.

COLUMN 1

Line 35, "recording reproduction" should read --recording/reproduction--.

COLUMN 2

Line 46, "(squalirium" should read --(squarilium--.

COLUMN 4

Line 7, "two-" should read --two--;

Line 11, "connected" should read --connected to--;

Line 41, "slide on slides" should read --slides on slide--; and

Line 55, "slide on" should read --slides on--.

COLUMN 5

Line 28, "a" should read --an--.

UNITED STATES PATENT AND TRADEMARK OFFICE
CERTIFICATE OF CORRECTION

PATENT NO. : 5,392,275

DATED : February 21, 1995

INVENTOR : HARUKI KAWADA, ET AL.

It is certified that errors appear in the above-identified patent and that said Letters Patent is hereby corrected as shown below:

<u>COLUMN 7</u>

Line 2, "probes 408" should read --probes 406--; and

Line 11, "electrodes" should read --electrodes 406--.

Signed and Sealed this

First Day of August, 1995

Attest:

BRUCE LEHMAN

Attesting Officer

Commissioner of Patents and Trademarks